US012266454B2

(12) United States Patent
Xu et al.

(10) Patent No.: US 12,266,454 B2
(45) Date of Patent: Apr. 1, 2025

(54) HOT PRESSING MACHINE AND METHOD FOR CONTINUOUSLY HOT PRESSING FLEXIBLE FLAT CABLE

(71) Applicants: Tyco Electronics (Shanghai) Co., Ltd., Shanghai (CN); TE Connectivity Services GmbH, Schaffhausen (CH)

(72) Inventors: Zhonghua Xu, Shanghai (CN); Dandan (Emily) Zhang, Shanghai (CN); Roberto Francisco-Yi Lu, Bellevue, WA (US); Jian Cao, Shanghai (CN); Lvhai (Samuel) Hu, Shanghai (CN)

(73) Assignees: Tyco Electronics (Shanghai) Co., Ltd., Shanghai (CN); TE Connectivity Solutions GmbH, Schaffhausen (CH)

( * ) Notice: Subject to any disclaimer, the term of this patent is extended or adjusted under 35 U.S.C. 154(b) by 367 days.

(21) Appl. No.: 17/729,583

(22) Filed: Apr. 26, 2022

(65) Prior Publication Data

US 2022/0344077 A1 Oct. 27, 2022

(30) Foreign Application Priority Data

Apr. 27, 2021 (CN) ........................ 202110463054.1

(51) Int. Cl.
*B32B 41/00* (2006.01)
*H01B 7/08* (2006.01)
*H01B 13/10* (2006.01)

(52) U.S. Cl.
CPC ............ *H01B 13/103* (2013.01); *H01B 7/08* (2013.01)

(58) Field of Classification Search
CPC .... H01B 13/103; H01B 7/08; H01B 13/0016; H01B 7/0838; H01B 13/0013; H01B 13/0036
USPC .................... 156/60, 64, 350, 351, 378, 379
See application file for complete search history.

(56) References Cited

U.S. PATENT DOCUMENTS

2013/0037303 A1* 2/2013 Wang .................. H01R 13/025 174/117 FF
2017/0032871 A1* 2/2017 Kiuchi ............... H01B 13/0036

* cited by examiner

*Primary Examiner* — Michael N Orlando
*Assistant Examiner* — Joshel Rivera
(74) *Attorney, Agent, or Firm* — Barley Snyder

(57) ABSTRACT

A hot pressing machine for continuously hot pressing a flexible flat cable includes a plurality of hot pressing units arranged at intervals along a feeding direction of the flexible flat cable. A central controller of the machine is operably connected to the plurality of hot pressing units and is configured to control the plurality of hot pressing units to synchronously hot press the flexible flat cable located in the plurality of hot pressing units.

21 Claims, 4 Drawing Sheets

HOT PRESSING MACHINE AND METHOD FOR CONTINUOUSLY HOT PRESSING FLEXIBLE FLAT CABLE

CROSS-REFERENCE TO RELATED APPLICATIONS

This application claims the benefit of Chinese Patent Application No. CN202110463054.1 filed on Apr. 27, 2021 in the State Intellectual Property Office of China, the whole disclosure of which is incorporated herein by reference.

FIELD OF THE INVENTION

Embodiments of the present disclosure generally relate to the field of manufacturing flexible flat cable, and more particularly, to a hot pressing machine and method for continuously hot pressing the flexible flat cable.

BACKGROUND

In the prior art, during production of a flexible flat cable, it is necessary to clamp the conductor of the flexible flat cable between two insulating layers and fill insulating glue between the two insulating layers to fix the conductor and the insulating layer together. In order to cure the insulation glue while holding the conductor in place, the flexible flat cable needs to be heated and pressurized (hereinafter referred to as "hot pressing"). Curing the insulating glue requires the flexible flat cable to stand for a long time, usually half an hour, which makes it difficult to carry out continuous hot pressing on the flexible flat cable in an automatic way. The longer the curing time, the longer the travel distance of the automatic production line, and the larger the size of the hot pressing machine is required to accommodate the longer travel distance of the automatic production line. This not only leads to the high manufacturing cost of the hot pressing machine, but also to the large floor area of the hot pressing machine, which is not expected by the manufacturers of flexible flat cables. Therefore, at present, the flexible flat cable can only be hot pressed manually.

SUMMARY

According to an embodiment of the present disclosure, a hot pressing machine for continuously hot pressing a flexible flat cable includes a plurality of hot pressing units arranged at intervals along a feeding direction of the flexible flat cable. A central controller of the machine is operably connected to the plurality of hot pressing units and is configured to control the plurality of hot pressing units to synchronously hot press the flexible flat cable located in the plurality of hot pressing units.

BRIEF DESCRIPTION OF THE DRAWINGS

The invention will now be described by way of example with reference to the accompanying Figures, of which.

DETAILED DESCRIPTION OF THE EMBODIMENTS

Figure 1:
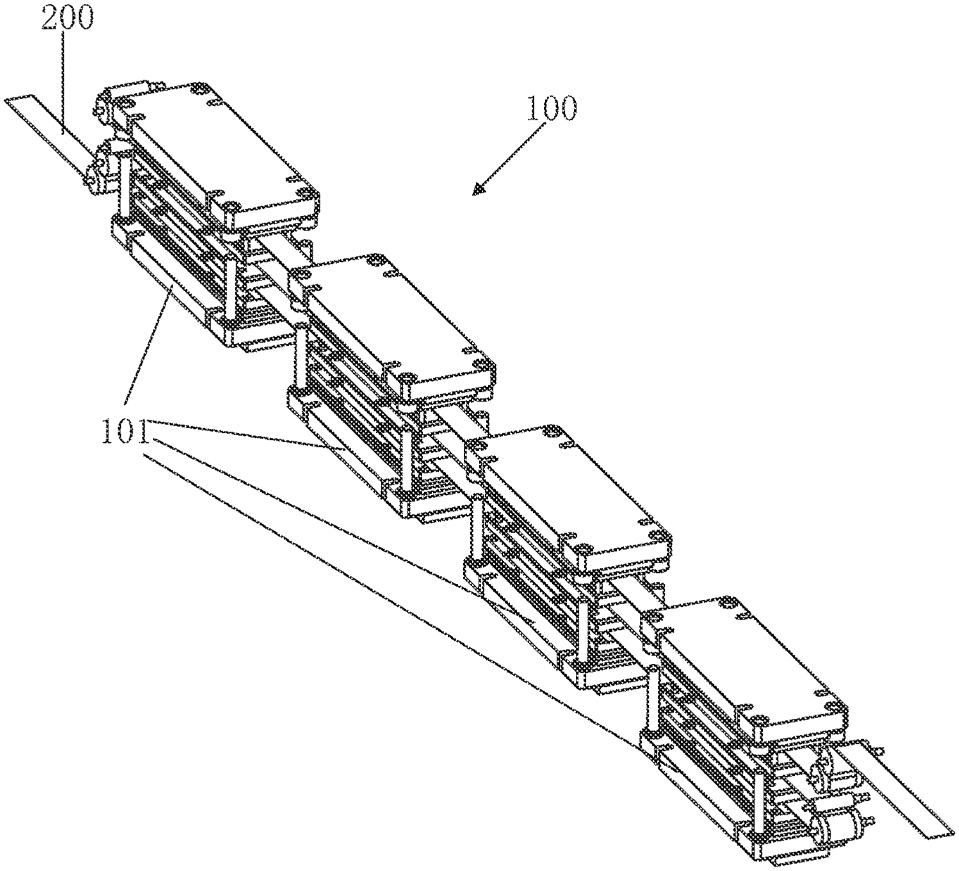
FIG. 1 is a perspective view of a hot pressing machine for continuously hot pressing a flexible flat cable according to an embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present invention, there is provided a hot pressing machine for continuously hot pressing a flexible flat cable. The hot pressing machine comprises of: a plurality of hot pressing units arranged at intervals along a feeding direction of the flexible flat cable; and a central controller operably connected to the plurality of hot pressing units and configured to control the plurality of hot pressing units to synchronously hot press the flexible flat cable located in the plurality of hot pressing units.

Figure 2:
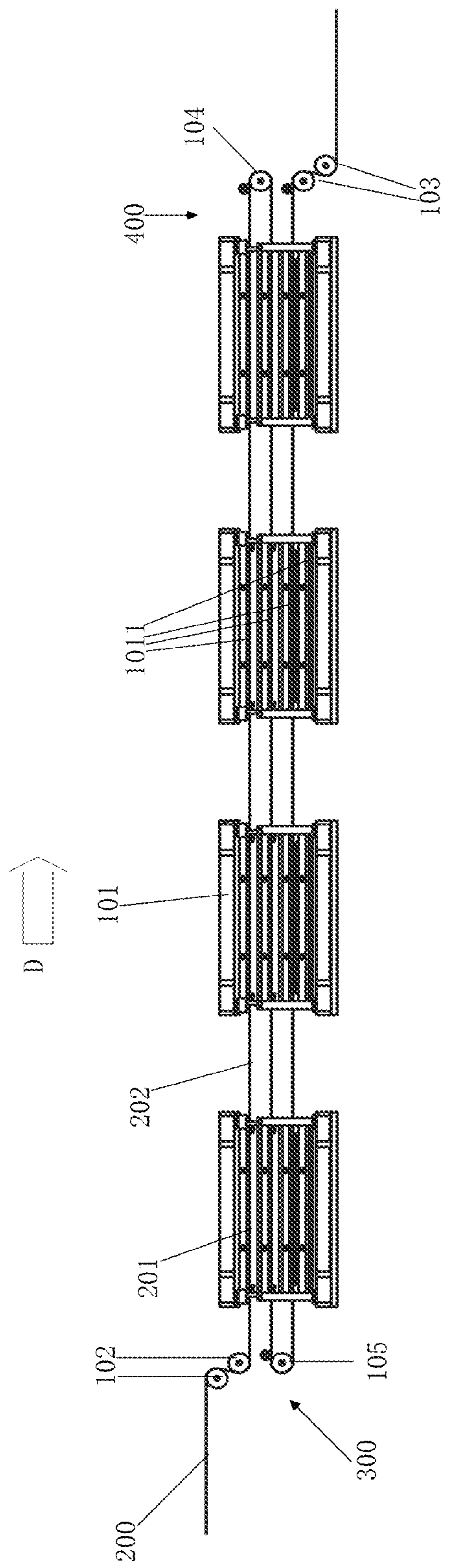
FIG. 2 is a side view of the hot pressing machine shown in FIG. 1.

FIG. 1 is a perspective view of a hot pressing machine 100 for continuous hot pressing of a flexible flat cable 200 according to an embodiment of the present invention. FIG. 2 is a side view of the hot pressing machine 100 shown in FIG. 1. As shown in FIGS. 1 to 2, the hot pressing machine 100 includes an input roller 102, an output roller 103, and four hot pressing units 101. The input roller 102 is located at the input side 300 of the hot pressing machine 100, and a flexible flat cable 200 is fed into the hot pressing machine 100 through the input roller 102. The output roller 103 is located at the output side 400 of the hot pressing machine 100, and the flexible flat cable 200 is output from the hot pressing machine 100 through the output roller 103. The four hot pressing units 101 are located between the input roller 102 and the output roller 103, arranged along the feeding direction D of the flexible flat cable 200 and spaced from each other.

The number of hot pressing units 101 is not limited to four. The number of hot pressing units 101 can be set according to the actual needs of the length of the flexible flat cable 200, the curing time of the insulating adhesive, the floor area, etc., that is, the number of hot pressing units 101 can be more than four or less than four. These discrete hot pressing units 101 should be the same, have the same operating parameters and can realize the same operating functions. By setting a plurality of discrete and identical hot pressing units 101, it is possible to avoid designing the hot pressing machine 100 as a single large and complex machine, so that the automation of continuous hot pressing of the flexible flat cable 200 can be realized with a simple mechanical structure.

Figure 5:
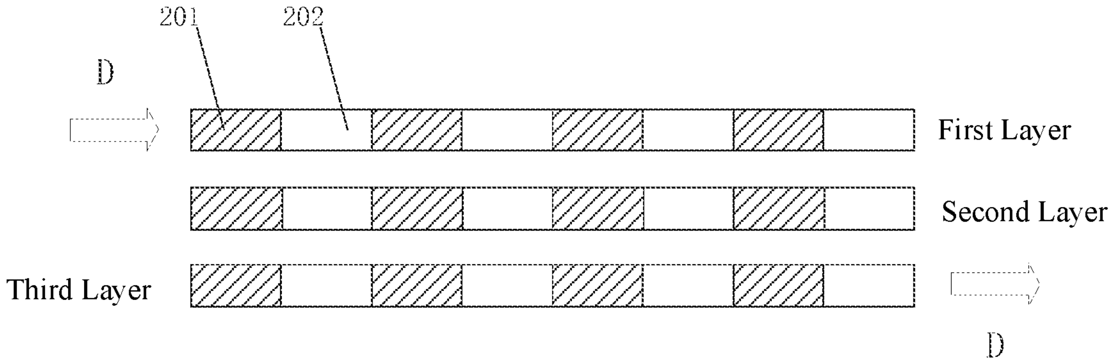
FIG. 5 is a schematic diagram showing the principle of continuous hot pressing of a flexible flat cable according to an embodiment of the present invention.

In order to unify the operation of the hot pressing unit 101, the central controller (not shown in the figure) of the hot pressing machine 100 is operably connected to the plurality of hot pressing units 101 and is configured such that the plurality of hot pressing units 101 synchronously hot press the flexible flat cable 200 located in each of the plurality of hot pressing units 101. The flexible flat cable 200 is divided into a first part 201 and a second part 202 arranged alternately at intervals from each other, as shown in FIG. 5, which will be described in further detail below. The central controller is also configured to move the first parts 201 out of the corresponding hot pressing units 101 after the first parts 201 are synchronously pressed by the plurality of hot pressing units 101, and move the second parts 202 of the flexible flat cable 200 between two adjacent hot pressing units 101 into the corresponding hot pressing units 101 to synchronously hot press the second parts 202, that is, each feeding distance of the flexible flat cable 200 is equal to the length of the second part 202. In this way, the continuous hot pressing of a certain length of flexible flat cable 200 can be completed in only two steps. After the hot pressing is completed, the hot pressed flexible flat cable 200 is removed from the hot pressing machine 100, and the subsequent flexible flat cable 200 to be hot pressed is moved into the hot pressing machine 100, which maintains the continuity of hot pressing operation and avoids equipment wear caused by repeated startup or shutdown. The manufacturing process of the flexible flat cable 200 is greatly simplified.

In order to ensure that all parts of the flexible flat cable 200 can be hot pressed, the spacing along the feeding direction D between adjacent hot pressing units 101 is usually equal to or slightly less than the length along the feeding direction D of a single hot pressing unit 101, so that the length of the second part 202 is equal to or slightly less than the length of the first part 201. This ensures that the adjacent section between the first part 201 and the second part 202 can always be hot pressed.

Figure 3:
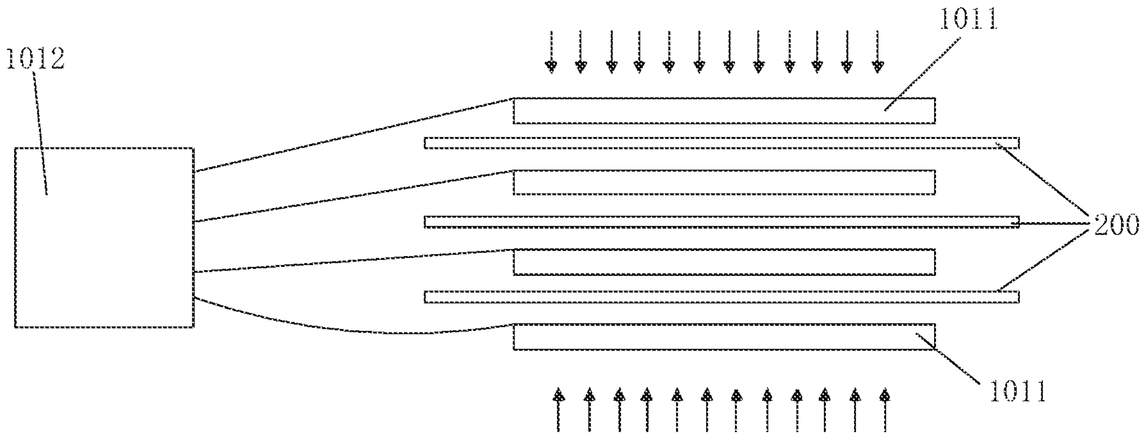
FIG. 3 is a simplified side view of the hot pressing unit of the hot pressing machine in FIG. 2.

As shown in FIG. 2, the hot pressing machine 100 also includes a first reverse roller 104 and a second reverse roller 105. The first reverse roller 104 is located at the output side 400 of the hot pressing machine 100 and above the output roller 103, and the flexible flat cable 200 enters the hot pressing machine 100 in the direction opposite to the feeding direction D through the first reverse roller 104 and travels to the input side 300. The second reverse roller 105 is located at the input side 300 of the hot pressing machine 100 and below the input roller 102. The flexible flat cable 200 traveling to the input side 300 through the first reverse roller 104 enters the hot pressing machine 100 along the feeding direction D through the second reverse roller 105 and travels to the output side 400. The first reverse roller 104 and the second reverse roller 105 fold the flexible flat cable 200 into three layers in the hot pressing machine 100. Accordingly, each hot pressing unit 101 includes four hot pressing plates 1011 (as shown in FIG. 3), which are aligned in the vertical direction and used for synchronous hot pressing of the flexible flat cable 200 folded into three layers. Each layer of the flexible flat cable 200 is adapted to be pressed between adjacent two hot pressing plates 1011. Layering the flexible flat cable 200 by the reverse roller greatly prolongs the length of the flexible flat cable 200 that can be hot pressed by the hot pressing machine 100 at one time, reduces the number of hot pressing units 101, and reduces the manufacturing cost of the hot pressing machine 100. The flexible flat cable 200 is not limited to three layers, but more reverse rollers can be set according to actual needs to fold the flexible flat cable 200 into five or seven layers. For ease of description, the present application will only take the hot pressing machine 100 including two reverse rollers as an example.

In order to ensure that all parts of the flexible flat cable 200 can be hot pressed, each of the first reverse roller 104 and the second reverse roller 105 is separated from the adjacent hot pressing unit 101 by a distance equal to half the length of the second part 202. That is, a distance between the first reverse roller 104 and the hot pressing unit 101 adjacent to the first reverse roller 104 is equal to half the length of the second part 202; and a distance between the second reverse roller 105 and the hot pressing unit 101 adjacent to the second reverse roller 105 is equal to half the length of the second part 202.

Figure 4:
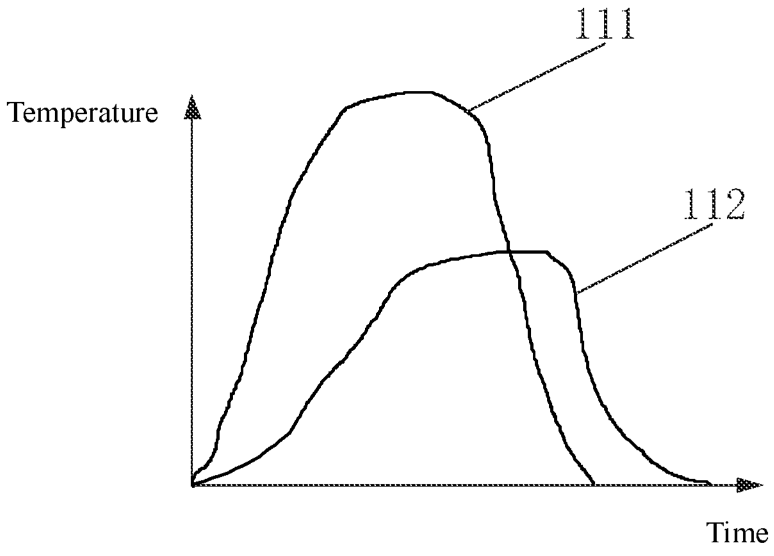
FIG. 4 is a graph of the relative relationship between temperature and time of hot pressing different flexible flat cables with different pressures using the hot pressing machine shown in FIG. 1.

As shown in FIG. 3, in order to better control the operation of the hot pressing plate 1011, each hot pressing unit 101 also includes a hot pressing controller 1012 operably connected to the four hot pressing plates 1011. Different types of flexible flat cables 200 need to be hot pressed at different temperatures and pressures for different periods of time. The hot pressing controller 1012 is configured to determine a control curve describing the relationship between temperature and time (FIG. 4 shows an example of two control curves 111 and 112), and control the pressure applied by the hot pressing plate 1011 based on the control curve. This further improves the accuracy and automation of continuous hot pressing of the flexible flat cable 200.

The hot pressing controller 1012 is also configured to adjust the control curve by adjusting one or more of the following parameters: preheating time, curing time, cooling time, curing temperature, etc.

FIG. 5 shows the principle of continuous hot pressing of the flexible flat cable 200 according to an embodiment of the present invention. In FIG. 5, the flexible flat cable 200 is folded into three layers in the hot pressing machine 100. For ease of description, the flexible flat cable 200 comprises a first part 201 and a second part 202 alternately arranged along the feeding direction D and spaced from each other. For the convenience of distinguishing, the first part 201 is shaded and the second part 202 is not shaded in FIG. 5. For the convenience of illustration, the connecting section between layers is omitted in FIG. 5.

The method for continuously hot pressing the flexible flat cable 200 based on this principle includes:

feeding the flexible flat cable 200 into the hot pressing machine 100, which includes a plurality of hot pressing units 101 arranged along the feeding direction D of the flexible flat cable 200 and spaced from each other;

synchronously hot pressing the first part 201 of the flexible flat cable 200 located in each of the plurality of hot pressing units 101 with the plurality of hot pressing units 101;

after performing synchronous hot pressing on the first parts 201, moving the second parts 202 of the flexible flat cable 200 between two adjacent hot pressing units 101 in the plurality of hot pressing units 101 into the corresponding hot pressing units 101 to perform synchronous hot pressing on the second parts 202; and removing the flexible flat cable 200 from the hot pressing machine 100.

The step of feeding the flexible flat cable 200 comprises feeding the flexible flat cable 200 is fed into the hot pressing machine 100 through the input roller 102 located at the input side 300 of the hot pressing machine 100. Subsequently, the flexible flat cable 200 moving toward the output side 400 enters the hot pressing machine 100 in a direction opposite to the feeding direction D through the first reverse roller 104 located at the output side 400 of the hot pressing machine 100, and travels to the input side 300. Next, the flexible flat cable 200 moving toward the input side 300 enters the hot pressing machine 100 along the feeding direction D through the second reverse roller 105 located at the input side 300 of the hot pressing machine 100, and travels to the output side 400. Finally, the flexible flat cable 200 is output from the hot pressing machine 100 through the output roller 103 located at the output side 400 of the hot pressing machine 100.

In the step of synchronously hot pressing the first parts 201 and/or the second parts 202, the pressure applied by the hot pressing plate 1011 of the hot pressing machine 100 is controlled based on a predetermined control curve describing the relationship between temperature and time.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A hot pressing machine for continuously hot pressing a flexible flat cable, comprising:

a plurality of hot pressing units arranged at intervals along a feeding direction of the flexible flat cable, each hot pressing unit includes four hot pressing plates aligned in a vertical direction perpendicular to the feeding direction, and the flexible flat cable is adapted to be hot pressed between adjacent two hot pressing plates; and a central controller operably connected to the plurality of hot pressing units and controlling the plurality of hot pressing units to synchronously hot press the flexible flat cable located in the plurality of hot pressing units.

2. The hot pressing machine according to claim 1, wherein the flexible flat cable includes a first part and a second part which are alternately arranged at intervals in a length direction of the flexible flat cable.

3. The hot pressing machine according to claim 2, wherein the central controller adapted to move the first parts out of the hot pressing units after the first parts located in the plurality of hot pressing units are synchronously hot pressed, and move the second parts adjacent to the pressed first parts into the corresponding hot pressing units to synchronously hot press the second parts.

4. The hot pressing machine according to claim 3, wherein the length of the second part is equal to or slightly less than the length of the first part.

5. The hot pressing machine according to claim 4, further comprising:

an input roller located at an input side of the hot pressing machine; and an output roller located at an output side of the hot pressing machine, the flexible flat cable being fed into the hot pressing machine through the input roller, and output from the hot pressing machine through the output roller.

6. The hot pressing machine according to claim 5, further comprising a first reverse roller located at the output side of the hot pressing machine, the flexible flat cable entering into the hot pressing machine in a direction opposite to the feeding direction through the first reverse roller and travels to the input side.

7. The hot pressing machine according to claim 6, further comprising a second reverse roller located at the input side of the hot pressing machine, the flexible flat cable traveling to the input side through the first reverse roller enters into the hot pressing machine along the feeding direction through the second reverse roller and travels to the output side.

8. The hot pressing machine according to claim 7, wherein a distance between the first reverse roller and the hot pressing unit adjacent to the first reverse roller is equal to half the length of the second part.

9. The hot pressing machine according to claim 8, wherein a distance between the second reverse roller and the hot pressing unit adjacent to the second reverse roller is equal to half the length of the second part.

10. The hot pressing machine according to claim 1, wherein each hot pressing unit further includes a hot pressing controller operably connected to the four hot pressing plates, the hot pressing controller is configured to determine a control curve indicative of a relationship between temperature and time and control a pressure applied by the hot pressing plate based on the determined control curve.

11. The hot pressing machine according to claim 10, wherein the hot pressing controller adjusts the control curve by adjusting one or more of the parameters of preheating time, curing time, cooling time or curing temperature.

12. A method for continuously hot pressing a flexible flat cable, comprising steps of:

feeding the flexible flat cable into a hot pressing machine, the hot pressing machine including a plurality of hot pressing units arranged at intervals along a feeding direction of the flexible flat cable;

synchronously hot pressing first parts of the flexible flat cable located in the plurality of hot pressing units by the plurality of hot pressing units;

moving second parts, which are adjacent to the pressed first parts, of the flexible flat cable into the hot pressing units to synchronously hot press the second parts, wherein in the step of hot pressing at least one of the first parts or the second parts, a pressure applied by hot pressing plates of the hot pressing machine is controlled based on a control curve indicative of a relationship between temperature and time; and removing the flexible flat cable from the hot pressing machine.

13. The method according to claim 12, wherein during the step of feeding the flat flexible cable:

the flexible flat cable is fed into the hot pressing machine through an input roller located at an input side of the hot pressing machine; and the flexible flat cable traveling to the output side enters into the hot pressing machine in a direction opposite to the feeding direction through a first reverse roller located at an output side of the hot pressing machine and travels to the input side.

14. The method according to claim 13, wherein during the step of feeding the flat flexible cable:

the flexible flat cable traveling to the input side enters into the hot pressing machine in the feeding direction through a second reverse roller located at the input side of the hot pressing machine and travels to the output side; and the flexible flat cable is output from the hot pressing machine through an output roller located at the output side of the hot pressing machine.

15. The method according to claim 14, wherein a distance between the first reverse roller and the hot pressing unit adjacent to the first reverse roller is equal to half the length of the second part.

16. The method according to claim 15, wherein a distance between the second reverse roller and the hot pressing unit adjacent to the second reverse roller is equal to half the length of the second part.

17. The method according to claim 12, further comprising the step of adjusting the control according to at least one of the parameters of preheating time, curing time, cooling time or curing temperature.

18. The method according to claim 12, wherein the length of the second part is equal to the length of the first part.

19. A hot pressing machine for continuously hot pressing a flexible flat cable, comprising:

a plurality of hot pressing units arranged at intervals along a feeding direction of the flexible flat cable, each hot pressing unit includes a plurality of hot pressing plates aligned in a vertical direction, hot pressing machine adapted hot press multiple layers of the flat flexible cable overlapping in the vertical direction, each layer of the flat flexible cable arranged between an adjacent two of the plurality of hot pressing plates; and a central controller operably connected to the plurality of hot pressing units and controlling the plurality of hot pressing units to synchronously hot press the flexible flat cable located in the plurality of hot pressing units.

20. The hot pressing machine according to claim 19, further comprising:

an input roller located at an input side of the hot pressing machine;

an output roller located at an output side of the hot pressing machine, the flexible flat cable being fed into the hot pressing machine through the input roller, and output from the hot pressing machine through the output roller; and a reverse roller located at the output side of the hot pressing machine, the flexible flat cable entering into the hot pressing machine in a direction opposite to the feeding direction through the reverse roller and traveling to the input side.

21. A hot pressing machine for continuously hot pressing a flexible flat cable, comprising:

a plurality of hot pressing units arranged at intervals along a feeding direction of the flexible flat cable, each hot pressing unit includes a hot pressing controller operably connected to at least one hot pressing plate, the hot pressing controller is adapted to determine a control curve indicative of a relationship between temperature and time and control a pressure applied by the at least one hot pressing plate based on the determined control curve; and a central controller operably connected to the plurality of hot pressing units and controlling the plurality of hot pressing units to synchronously hot press the flexible flat cable located in the plurality of hot pressing units.

* * * * *